(12) United States Patent
Takasan et al.

(10) Patent No.: US 6,994,207 B2
(45) Date of Patent: Feb. 7, 2006

(54) DRIVING UNIT FOR TRANSDUCER

(75) Inventors: Masaki Takasan, Kariya (JP); Tatsuya Uematsu, Kariya (JP); Yoshikazu Koike, Yokohama (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 600 days.

(21) Appl. No.: 10/280,761

(22) Filed: Oct. 25, 2002

(65) Prior Publication Data
US 2003/0081798 A1 May 1, 2003

(30) Foreign Application Priority Data
Oct. 26, 2001 (JP) .............................. 2001-329794

(51) Int. Cl.
*B65G 27/00* (2006.01)
(52) U.S. Cl. .................. 198/752.1; 198/630; 198/766; 310/323.01
(58) Field of Classification Search ................ 198/630, 198/752.1, 758, 759, 761, 762, 766; 310/320, 310/321, 323.01, 323.06
See application file for complete search history.

(56) References Cited
U.S. PATENT DOCUMENTS

| | | | | |
|---|---|---|---|---|
| 5,777,232 A | * | 7/1998 | Kurita et al. ............. | 198/752.1 |
| 5,944,170 A | * | 8/1999 | LaVeine et al. ............. | 198/762 |
| 6,465,932 B2 | * | 10/2002 | Yagi ........................... | 198/756 |
| 6,609,609 B2 | * | 8/2003 | Takasan et al. ............. | 198/630 |
| 6,637,585 B2 | * | 10/2003 | Takasan et al. .......... | 198/752.1 |
| 6,802,220 B2 | * | 10/2004 | Takasan et al. ............. | 198/630 |

FOREIGN PATENT DOCUMENTS

| JP | 07-137824 | 5/1995 |
|---|---|---|
| JP | 09-202425 | 8/1997 |

OTHER PUBLICATIONS

"The Ultrasound Handbook," p. 664, with partial English translation.

* cited by examiner

*Primary Examiner*—James R. Bidwell
(74) *Attorney, Agent, or Firm*—Morgan & Finnegan, LLP

(57) ABSTRACT

A vibrating transducer is coupled to one end of an elongated vibrating plate and a receiving transducer is coupled to the other end of the vibrating plate. Langevin transducers are used for the vibrating and receiving transducers. Each transducer includes a pair of annular piezoelectric elements. The vibrating transducer is connected to an oscillator. A controller controls the oscillator. Detection signals of a voltage sensor, which detects the vibrating state of the receiving side of the vibrating plate, are fed back to the controller. The controller controls the oscillator such that the phase difference between the vibration of the vibrating side and the receiving side is within a predetermined range and that the receiving side is vibrated by amplitude greater than or equal to a predetermined amplitude.

19 Claims, 2 Drawing Sheets

DRIVING UNIT FOR TRANSDUCER

BACKGROUND OF THE INVENTION

The present invention relates to a driving unit for driving a transducer that vibrates an elongated vibrating body. More specifically, the present invention pertains to a driving unit that is suitable for an apparatus that levitates an object by acoustic radiation pressure of sound waves.

Japanese Laid-Open Patent Publications No. 7-137824 and No. 9-202425 each discloses an apparatus that has such driving unit. Each apparatus includes an elongated vibrating body, a vibrating transducer, and a receiving transducer. The vibrating transducer is located on one end of the vibrating body and generates oscillating wave (sound wave). The receiving transducer is located on the other end of the vibrating body and receives the oscillating wave. The vibrating transducer in cooperation with the receiving transducer generates traveling waves on the vibrating body, which levitates an object from the surface of the vibrating body and transports the levitated object by acoustic radiation pressure of the traveling waves. The receiving transducer has a load circuit to generate traveling waves on the vibrating body. The load circuit converts vibrational energy of the transducer to electrical energy. The load circuit has a resistance that consumes the electrical energy in the form of heat. The above publication No. 9-202425 discloses an apparatus for transporting a plate-like wide object. The apparatus generates traveling waves on several vibrating bodies arranged parallel to one another to transport a wide object.

The apparatus uses a Langevin transducer that uses a piezoelectric element as a vibrating transducer. The transducer that uses a piezoelectric element is excited at a resonance frequency of the vibrating system, which vibrates the vibrating body at a required magnitude (amplitude). The vibrating system means all parts of the apparatus which can be vibrated.

The above publications discloses that the vibrating transducer is excited at a resonance frequency of the vibration system but does not disclose any controlling method of an oscillator that excites the transducer.

A typical driving system for stably driving a piezoelectric transducer includes a bridge feedback oscillator or a vibration feedback oscillator (see The Ultrasound Handbook). Assume that the terminal voltage of an electrostriction transducer (piezoelectric transducer) is represented by V, the terminal current is represented by I, the damping admittance is represented by Yd, and the dynamic admittance is represented by Ym. The bridge feedback oscillator utilizes the characteristic that the current YmV that flows through a piezoelectric element with the dynamic admittance is proportional to the vibration speed. More specifically, a feedback oscillation is performed by inserting a bridge circuit between a power amplifier and a transducer and picking up the voltage, which is proportional to the vibration speed. FIG. 5 shows a bridge circuit, which has an electrostriction transducer 40 on one side. The damping admittance Yd of the bridge circuit is balanced such that the bridge output voltage is zero when the electrostriction transducer 40 is damped. Thus, the bridge output, which is proportional to the vibrating speed, is obtained when the electrostriction transducer 40 is vibrated.

In the vibration feedback oscillator, an electrode of the vibrating transducer, more specifically, piezoelectric transducer, is divided and part of the electrode is used as a pickup for detecting the output, which is proportional to the vibration speed. Based on the output voltage, the vibrating transducer is oscillated.

However, in the bridge feedback oscillator, it takes a lot of trouble to adjust a constant number of the circuit at a bridge portion. Further, the constant number needs to be adjusted every time the load changes.

On the other hand, in the vibrating feedback oscillator, a pickup is mechanically coupled to a piezoelectric transducer. Thus, the reliability or the mounting space can be concerned.

When the vibrating transducer and the receiving transducer are apart from each other such as in a case when an elongated plate-like vibrating body is used, although the vibrating body is vibrated in a suitable manner on the side close to the vibrating transducer, the side of the vibrating body close to the receiving transducer might not be vibrated in a suitable manner. In the above described prior art oscillators, only the components corresponding to the vibration of the vibrating transducer are fed back to control a vibration state of the vibrating body. Thus, even when such feedback is performed, the entire vibrating body might not vibrate evenly.

Also, an elongated vibrating body has several points of resonance frequencies. Therefore, if only the side of the vibrating body close to the vibrating transducer is observed, the vibrating body might be vibrated in an undesired mode. Particularly, when generating standing waves on the vibrating body, the vibrating body is preferably vibrated at a resonance point. However, when generating traveling waves on the vibrating body, the vibrating body is preferably vibrated at a frequency that is not the resonance point. In this case, the vibrating body is preferably vibrated at a frequency in the vicinity of the resonance point and by a predetermined phase difference from the phase of the receiving transducer. Thus, although the electrical impedance of signals from the vibrating transducer is detected, the frequency that is suitable for traveling waves is not obtained.

BRIEF SUMMARY OF THE INVENTION

Accordingly, it is an objective of the present invention to provide a simple driving unit for efficiently and stably vibrating an entire vibrating body substantially evenly.

Another objective of the present invention is to provide a driving unit that drives a vibrating transducer at the optimal frequency to efficiently generate traveling waves on an elongated vibrating body.

To achieve the above objective, the present invention provides a driving unit for an apparatus having an elongated vibrating body, which has a first end and a second end. The first end is associated with a first transducer, and the second end is associated with a detecting means for detecting vibration at the second end. The driving unit comprises an oscillator connected to the first transducer, wherein the oscillator excites the first transducer, wherein, when excited, the first transducer vibrates the vibrating body; and a controller connected to the oscillator. The controller controls the oscillator based on a detection signal from the detecting means to excite the first transducer.

The present invention also provides driving unit for an apparatus for levitating an object. The apparatus having an elongated vibrating body, which has a first end and a second end, wherein the first end is associated with a first transducer, and the second end is associated with a detecting means including a second transducer and a vibration sensing element which is connected to the second transducer. The driving unit comprises an oscillator connected to the first transducer, wherein the oscillator excites the first transducer, and a controller connected to the oscillator. The controller controls the oscillator based on a detection signal from the detecting means to excite the first transducer. The first transducer is driven to levitate the object by acoustic radiation pressure of sound waves generated by vibration on the vibrating body.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
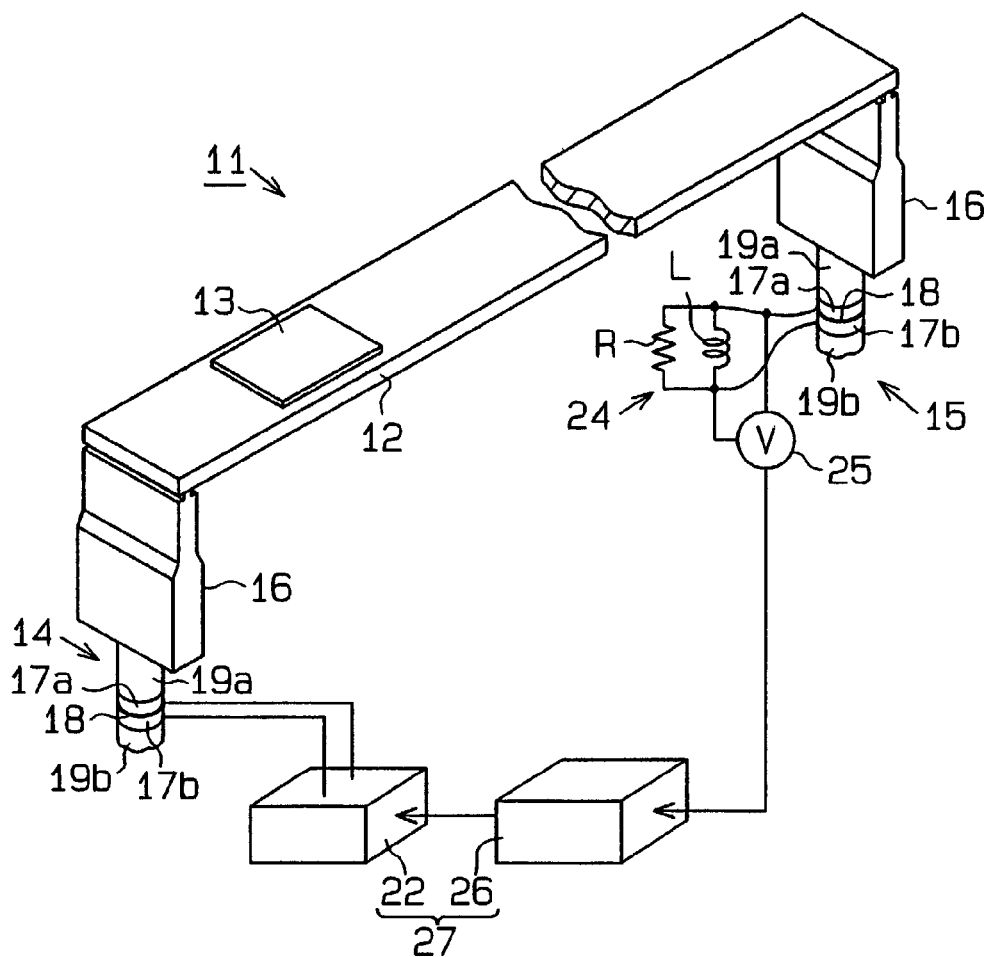
FIG. 1 is a schematic perspective view illustrating an apparatus that incorporates a driving unit according to a preferred embodiment of the present invention.

A preferred embodiment of a driving unit according to the present invention which is embodied in a apparatus 11 will now be described with reference to FIGS. 1 to 3. FIG. 1 is a schematic perspective view of the apparatus 11 that incorporates a driving unit 27 of the present invention. FIG. 3 is a schematic side view illustrating the apparatus 11 that incorporates the driving unit 27 of the present invention.

As shown in FIG. 1, the apparatus 11 includes an elongated vibrating body, which is a vibrating plate 12 in this embodiment. The vibrating plate 12 has a rectangular shape, the width of which is greater than the width of an object 13 to be transported. The vibrating plate 12 has a first end (left side as viewed in FIG. 1) and a second end (right side as viewed in FIG. 1). A vibrating transducer 14 and a receiving transducer 15 each has a horn 16. The vibrating transducer 14 and the receiving transducer 15 are coupled to the first and second ends at the distal end of the corresponding horn 16 with a screw (not shown), respectively. The vibrating transducer 14 vibrates the vibrating plate 12. The receiving transducer 15 receives the vibration. The side of the vibrating plate 12 coupled to the vibrating transducer 14 with the corresponding horn 16 is referred to as a vibrating side. The side of the vibrating plate 12 coupled to the receiving transducer 15 with the corresponding horn 16 is referred to as a receiving side. Each horn 16 is a flat and substantially rectangular solid. Each horn 16 is attached to the corresponding end of the vibrating plate 12 such that each horn 16 is perpendicular to the vibrating plate 12.

Each horn 16 is coupled to the corresponding one of the vibrating transducer 14 and the receiving transducer 15 with the surface that is opposite to the surface coupled to the vibrating plate 12. That is, one of the horns 16 forms a part of the vibrating transducer 14. The distal ends of the horns 16 are defined on a plane that is perpendicular to the axes of the vibrating and receiving transducers 14, 15. The axes of the horns 16 and the axes of the vibrating and receiving transducers 14, 15 extend vertically.

The vibrating and receiving transducers 14, 15 are Langevin transducers. Each of the vibrating and receiving transducers 14, 15 includes upper and lower annular piezoelectric elements 17a, 17b, an annular electrode plate 18 and upper and lower metal blocks 19a, 19b. The electrode plate 18 is located between the piezoelectric elements 17a, 17b. The upper metal block 19a contacts the upper side of the upper piezoelectric element 17a, and the lower metal block 19b contacts the lower side of the lower piezoelectric element 17b. The piezoelectric elements 17a, 17b, the electrode plate 18, and the metal blocks 19a, 19b are fastened to one another by a bolt (not shown). The bolt is inserted from the lower metal block 19b and is fastened with a threaded bore (not shown) formed in the upper metal block 19a. The two metal blocks 19a, 19b are electrically connected to each other by the bolt. As shown in FIG. 3, a flange 20 is formed at the upper end of each upper metal block 19a. Each upper metal block 19a is fitted in a hole (not shown) formed in a base plate 21 and is secured by a bolt, which is not shown.

The vibrating transducer 14 excites the horn 16, which is coupled to the vibrating side of the vibrating plate 12. The vibrating transducer 14 is connected to an oscillator 22. More specifically, the electrode plate 18 of the vibrating transducer 14 is connected to the oscillator 22 with a wire 23a. The ground terminal of the oscillator 22 is connected to the lower metal block 19b of the vibrating transducer 14 with a wire 23b.

As shown in FIG. 3, the upper and lower piezoelectric elements 17a, 17b of the receiving transducer 15 are connected to a load circuit 24, which includes a resistance R and a coil L, via the electrode plate 18 and the lower metal block 19b respectively. The upper and lower piezoelectric elements 17a, 17b convert electrical energy to mechanical energy and the load circuit converts electrical energy to thermal energy. A voltage sensor 25 is arranged to detect the voltage generated in the upper and lower piezoelectric elements 17a, 17b for detecting vibration of the receiving transducer 15. The receiving transducer 15 and the voltage sensor 25 detect the vibrating state of the receiving side of the vibrating plate 12.

The oscillator 22 is driven by control signals from a controller 26. The controller 26 includes a CPU (not shown) to which the voltage sensor 25 is connected via an A/D converter and an interface (both are not shown). Based on detection signals from the voltage sensor 25, the controller 26 controls the output of the oscillator 22 such that the output voltage of the upper and lower piezoelectric elements 17a, 17b is greater than or equal to a predetermined value. In this preferred embodiment, the controller 26 mainly controls the frequency.

The controller 26 controls the oscillator 22 such that the vibrating transducer 14 is vibrated to efficiently generate traveling waves on the vibrating plate 12. More specifically, the controller 26 controls the output frequency of the oscillator 22 such that the voltage V2 sent from the receiving transducer 15 becomes greater than or equal to a predetermined value while the difference between the phase of the voltage V1 supplied to the vibrating transducer 14 and the phase of the output voltage V2 (phase difference) is within a predetermined value or range.

Figure 2:
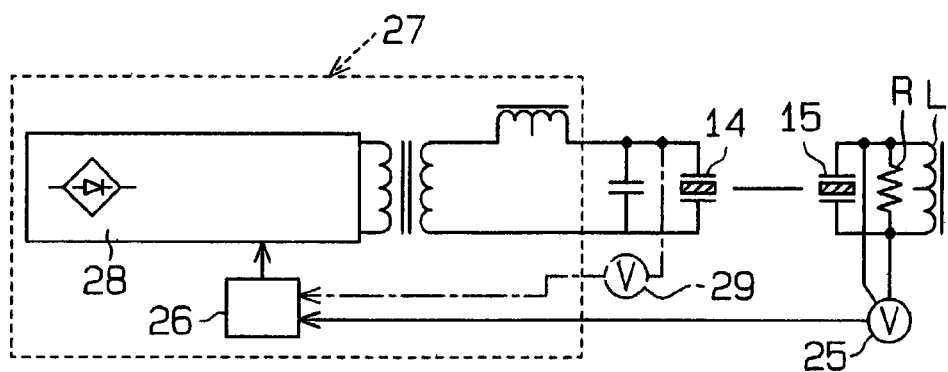
FIG. 2 is a schematic circuit diagram illustrating the driving unit according to the preferred embodiment.
Figure 3:
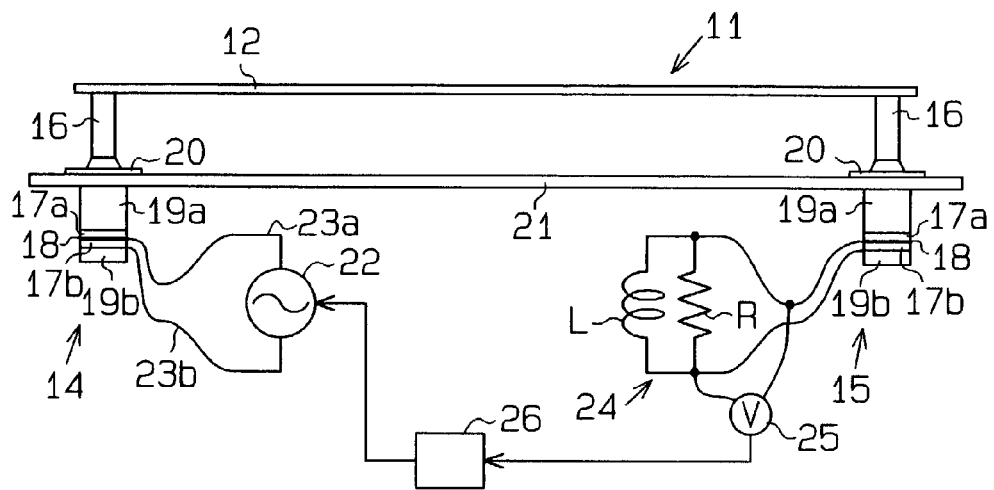
FIG. 3 is a schematic side view illustrating the apparatus that incorporates the driving unit according to the preferred embodiment of the present invention.

FIG. 2 is a schematic diagram illustrating the driving unit 27 of the present invention. The driving unit 27 includes a main circuit 28, which forms the oscillator 22, and the controller 26. The main circuit 28 includes a phase shifter (not shown) and is driven in accordance with control signals from the controller 26. The controller 26 receives output from the voltage sensor 25. The CPU of the controller 26 determines the vibrating state of the receiving transducer 15, which is coupled to the vibrating plate 12, in accordance with output signals from the voltage sensor 25. Further, the controller 26 controls the driving unit 27 such that the phase difference between the voltage of the vibrating side (V1) and the receiving side (V2) has a predetermined relationship and that the voltage of the receiving side is the greatest or is greater than or equal to a predetermined value.

The controller 26 includes a memory (not shown), which stores a map or an equation representing the relationship between the above phase difference and the optimal frequency for the traveling waves.

The operations of the apparatus 11, which is constructed as above, will hereafter be described.

The oscillator 22 is driven in accordance with control signals from the controller 26, which then excites the vibrating transducer 14 at frequency in the vicinity of a predetermined resonance frequency (e.g. approximately 20 kHz). When the vibrating transducer 14 is excited, the corresponding horn 16 is axially vibrated. Accordingly, the vibrating plate 12 is excited and produces flexural vibration. The flexural vibration generates sound waves on the vibrating plate 12. The object 13 is levitated from the surface of the vibrating plate 12 by acoustic radiation pressure of sound waves radiated from the vibrating plate 12. The levitation distance of the object 13 is several tens of micrometers to several hundreds of micrometers.

The vibration of the vibrating plate 12 is transmitted to the receiving transducer 15. The energy of the vibration, which is mechanical energy, is converted to electrical energy by the upper and lower piezoelectric elements 17a, 17b that form the receiving transducer 15. The electrical energy is converted to Joule heat at the resistance R of the load circuit 24 and is radiated away. As a result, waves of the vibration generated on the vibrating plate 12 become traveling waves traveling in one direction from the vibrating side to the receiving side (from the vibrating transducer 14 to the receiving transducer 15 in the preferred embodiment). The traveling waves cause the object 13 to be levitated and transported from the vibrating side to the receiving side of the vibrating plate 12.

When it is determined that the object 13 has reached the vicinity of a stop position by a detection signal from a sensor (not shown), the controller 26 changes the mode of the oscillator 22 to generate standing waves on the vibrating plate 12. The object 13 is then decelerated and stopped while being levitated.

The controller 26 controls the output of the oscillator 22 to generate traveling waves on the vibrating plate 12 traveling in a direction from the vibrating transducer 14 to the receiving transducer 15. More specifically, the controller 26 controls the output of the oscillator 22 such that the phase difference between the voltage V1 input the vibrating transducer 14 and the voltage V2 output from the receiving transducer 15 reaches a predetermined phase difference at which the traveling waves are easily generated (e.g. 90 degrees), and such that the output voltage of the receiving transducer 15 becomes greater than or equal to a predetermined value. The output voltage and the phase of the receiving transducer 15 are detected by output signals from the voltage sensor 25.

To efficiently vibrate the vibrating transducer 14 that uses piezoelectric elements to generate standing waves on the vibrating plate 12, the vibrating transducer 14 needs to be excited at the resonance frequency. Contrary, to vibrate the vibrating transducer 14 to efficiently produce traveling waves on the vibrating plate 12, the vibrating transducer 14 is preferably excited at a frequency that is slightly deviated from the resonance frequency. The controller 26 controls the oscillator 22 to excite the vibrating transducer 14 based on the phase difference and the frequency that are determined in a normal state to efficiently produce traveling waves. When the environment of the apparatus 11 is changed from the normal state, the phase and the frequency of the output voltage from the oscillator 22 deviate from the proper state. The normal state is a usage state in an environment in which the apparatus 11 is predicted to be used when manufacturing the apparatus 11.

The controller 26 always detects the vibrating state of the receiving transducer 15 by receiving signals from the voltage sensor 25. Thus, the controller 26 accurately obtains the vibrating state of the receiving transducer 15 from the phase and level of the output voltage V2. When it is determined that the vibrating state is deviated from a state in which traveling waves are efficiently generated on the vibrating plate 12, for example, when the vibration of the receiving transducer 15 becomes weaker, the controller 26 changes at least one of the phase and frequency of the output voltage V1 of the oscillator 22. After that, when it is determined that the vibrating state of the receiving transducer 15 has restored to a state in which traveling waves are efficiently generated from signals of the voltage sensor 25, the controller 26 continues driving the oscillator 22 in the same condition.

In the preferred embodiment, when driving the vibrating plate 12 by exciting the vibrating transducer 14, which is coupled to one end of the elongated vibrating plate 12, signals of the voltage sensor 25, which detects the vibrating state of the receiving side of the elongated vibrating plate 12, are fed back to the controller 26 to control the oscillator 22. Therefore, the oscillator 22 is controlled in accordance with the vibrating state of the receiving side of the elongated vibrating plate 12. Thus, the elongated vibrating plate 12 is stably and substantially evenly vibrated. Unlike the bridge feedback oscillator having a bridge circuit, the preferred embodiment need not adjust the constant number of the circuit.

The present invention is used to levitate the object 13 utilizing acoustic radiation pressure of sound waves generated by vibrating the elongated vibrating plate 12. Since the vibrating plate 12 is stably and evenly vibrated, the object 13 can be stably levitated by acoustic radiation pressure of sound wave generated by vibrating the vibrating plate 12.

The controller 26 of the present invention excites the vibrating transducer 14 to generate traveling waves on the elongated vibrating plate 12. In this state, by feedbacking the vibrating state of the receiving transducer 15 to the controller 26, the controller 26 can drive the vibrating transducer 14 at the optimal frequency such that the phase difference between the vibration of the vibrating side and the receiving side becomes optimal.

The voltage sensor 25, which detects the output voltage V2 of the upper and lower piezoelectric elements 17a, 17b, is used as a detecting element for detecting the vibrating state of the receiving transducer 15. Thus, the vibrating state of the receiving transducer 15 can be easily detected.

The controller 26 controls the output of the oscillator 22 such that the phase difference between the voltage V1 supplied to the vibrating transducer 14 and the output voltage V2 of the upper and lower piezoelectric elements 17a, 17b of the receiving transducer 15 is equal to the predetermined phase difference and that the output voltage V2 of the receiving transducer 15 is greater than or equal to the predetermined value. Therefore, although the vibrating state of the receiving side changes due to variation in the temperature or fluctuation of load on the vibration system caused by existence or non-existence of the object 13, the oscillator 22 can be controlled to supply voltage V1 having the proper phase and frequency to the vibrating transducer 14 in accordance with the phase and level of the output voltage V2.

When the vibrating state deviates from the optimal state due to, for example, environmental changes, the vibrating state can be re-optimized by changing the phase and frequency of the output voltage V1 of the oscillator 22. This simplifies the structure of the controller 26.

The vibrating transducer 14 and the receiving transducer 15 have the same structure including the upper and lower piezoelectric elements 17a, 17b and the like. This facilitates to electrically detect the vibrating state of the receiving transducer 15.

In the preferred embodiment, the upper and lower piezoelectric elements 17a, 17b, which form the receiving transducer 15, convert vibrational energy, which is mechanical energy, to electrical energy. The electrical energy is converted to Joule heat by the resistance R of the load circuit 24 and is radiated away. Therefore, compared to a case in which the vibrational energy is not consumed in the load circuit 24, traveling waves traveling from the vibrating side to the receiving side are easily generated by connecting the load circuit 24 to the receiving transducer 15.

It should be apparent to those skilled in the art that the present invention may be embodied in many other specific forms without departing from the spirit or scope of the invention. Particularly, it should be understood that the invention may be embodied in the following forms.

According to a modified embodiment of the present invention, the vibrating state of the receiving side of the elongated vibrating plate 12 may be determined by output current from the upper and lower piezoelectric elements 17a, 17b of the receiving transducer 15. In this case also, the vibrating state of the vibrating plate 12 is determined based on the level of the output current and whether the phase of the vibration of the receiving transducer 15 is shifted from the phase of the vibration of the vibrating transducer 14. To determine the vibrating state based on the output current, a current sensor or a voltage sensor is disposed on the receiving transducer 15. The receiving transducer 15 and the current sensor or the voltage sensor form vibrating state detecting means.

According to another modified embodiment of the present invention, the controller 26 may not detect the voltage of the output or the phase of the current of the detecting means that corresponds to the receiving side of the vibrating plate 12. The controller 26 may only detect the level of the output. When the level of the output becomes less than a predetermined value, the controller 26 adjusts the output frequency and the phase of the oscillator 22 to change the vibrating state of the vibrating transducer 14. In this case, the controller 26 cannot determine whether it is appropriate to change only one of the phase and the frequency or to change both of them. Therefore, for example, the controller 26 first changes the frequency and determines whether the output state has changed. The controller 26 then changes the phase and determines whether the output state has changed. If the output of the receiving side becomes greater than or equal to a predetermined level by changing the frequency or the phase, the controller 26 continues to drive the oscillator 22 in the same condition.

In an apparatus having the driving unit 27 of the present invention, the electrical energy converted from the vibrational energy of the upper and lower piezoelectric elements 17a, 17b of transducer 15 need not be consumed in the load circuit 24 when generating traveling waves on the vibrating plate 12. In this case, to efficiently generate traveling waves, the phase difference between the vibration of the vibrating transducer 14 and the vibration of the receiving transducer 15 needs to be maintained at a predetermined value and the output frequency of the oscillator 22 needs to be a proper value that is shifted from the resonance frequency by a predetermined amount. Detecting the vibrating state of the receiving transducer 15 by the output of the voltage sensor 25 allows the output of the oscillator 22 to be easily controlled such that the phase difference between the vibration of the vibrating transducer 14 and the receiving transducer 15 is adjusted to be an appropriate value when the vibrating state of the receiving side deviates from the proper state.

The driving unit 27 according to the present invention may be applied to an apparatus that maintains the object 13 at the levitated state by generating standing waves on the vibrating plate 12 instead of the apparatus that transports the object 13 in the levitated state by generating traveling waves on the vibrating plate 12. In this case, the receiving transducer 15 does not require the load circuit 24 for consuming electrical energy, which is converted from vibrational energy by the upper and lower piezoelectric elements 17a, 17b. Further, the vibrating state detecting means need not detect the phase of the output voltage of the upper and the lower piezoelectric elements 17a, 17b. The vibrating state detecting means may determine the vibration state in accordance with the level of the output voltage. This is because the vibrating plate 12 is only required to be vibrated at the resonance frequency to efficiently generate standing waves.

Further, according to another modified embodiment of the present invention, the memory of the controller 26 may store a map or an equation representing the relationship among the resonance frequency of the vibration system at the normal temperature, differences of the environmental temperature of the vibration system from the normal temperature and shift amount of the resonance frequency due to the temperature, and a proper phase difference between the vibration of the vibrating side and the receiving side for efficiently generating traveling waves. The controller 26 may calculate the proper resonance frequency based on detection signals from a temperature sensor and may control the output of the oscillator 22 such that the proper output frequency or the phase difference is obtained in accordance with the resonance frequency. Accordingly, the vibrating state of the receiving side is prevented from being deviated from a state in which traveling waves are efficiently generated.

In a configuration where the controller 26 does not have a temperature correcting function, the output frequency of the oscillator 22 may first be varied within a predetermined range when initial operation. The controller 26 may start to control the oscillator 22 at the frequency when the vibration of the receiving side is greatest.

As shown by a chained line in FIG. 2, a voltage sensor 29, which detects the voltage supplied to the upper and lower piezoelectric elements 17a, 17b of the vibrating transducer 14, may be provided to detect the vibrating state of the vibrating transducer 14. Detection signals of the voltage sensor 29 may also be sent to the controller 26. In this case, the phase difference between the vibration of the vibrating side and the receiving side is more accurately obtained than in a case when the vibrating state of the vibrating transducer 14 is indirectly determined from the output of the oscillator 22.

Figure 4:
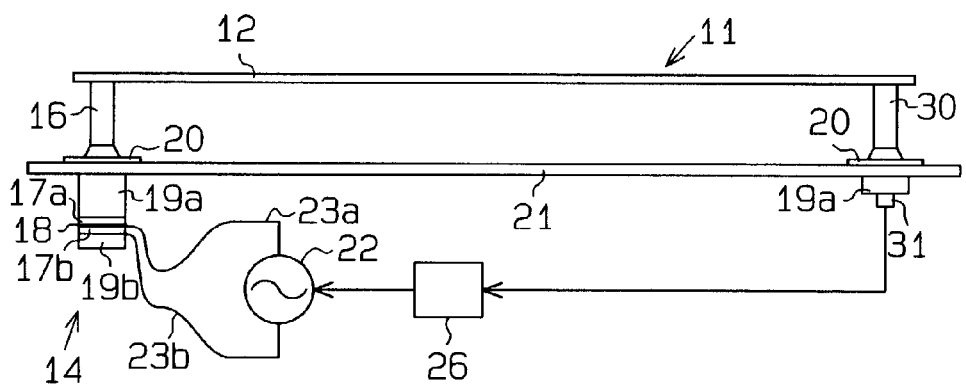
FIG. 4 is a schematic side view illustrating an apparatus that incorporates a driving unit according to another embodiment of the present invention.
Figure 5:
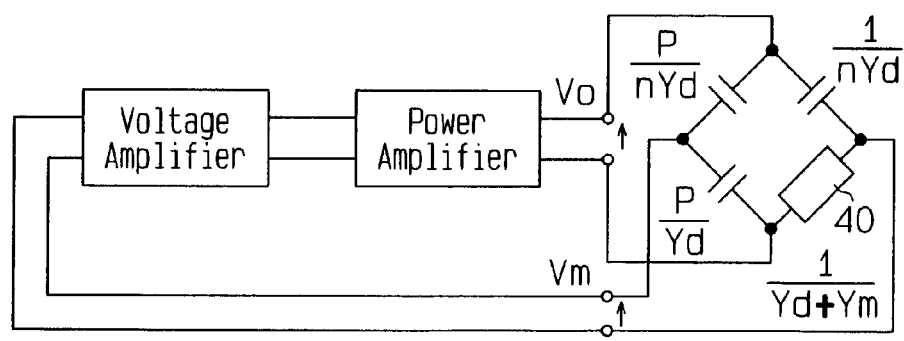
FIG. 5 is a schematic circuit diagram illustrating a prior art driving unit.

Instead of providing the receiving transducer 15, which has the upper and lower piezoelectric elements 17a, 17b, on the receiving side, the vibrating plate 12 may be secured to the base plate 21 with a horn 30 and a metal block 19a as shown in FIG. 4. In this case, vibration detecting means, which is a pickup 31, is disposed to the end of the horn 30 opposite to the end that is secured to the vibrating plate 12 through the base plate 21 and the metal block 19a. This simplifies the structure of the vibration detecting means, and then the vibration detecting means can be easily mounted to the horn 30.

In the preferred embodiment, the vibrating state of the receiving side is determined in accordance with the level of the vibration and the phase difference when generating traveling waves. However, the controller 26 may determine the vibrating state from only one of the level of the vibration and the phase difference.

In the apparatus 11 that generates traveling waves, the transducers 14 and 15 are coupled to the ends of the vibrating plate 12. The transducers 14 and 15 may be configured to be selectively connected to the oscillator 22 such that the vibrating side and the receiving side can be switched. In this case, by switching the connection of the oscillator 22, the direction of the traveling waves can be switched between one direction and the other on the vibrating plate 12. Thus, when levitating and transporting the object 13, the object 13 is easily braked and stopped at a predetermined position by switching the direction of the traveling waves.

If the width of the object 13 is wide, a plurality of apparatuses having the vibrating plate 12 and the vibrating and receiving transducers 14, 15 may be arranged parallel to one another. In this case, the vibrating transducer 14 of each apparatus may be connected in parallel to the common driving unit 27. The object 13 having wide width is stably levitated and transported by the vibrating plates 12.

The horns 16, 30 need not be flat rectangular solid. The horns 16, 30 may be columnar or have pointed distal end, such as a conical shape.

The object 13 need not be rectangular. The object 13 may have any shape including triangular, polygonal, or round.

The vibrating plate 12 need not be coupled to the horns 16, 30 by screws. The vibrating plate 12 may be secured to the horns 16, 30 using adhesive, or may be soldered or welded.

The driving unit 27 according to the preferred embodiment of the invention is not limited to be used for driving the apparatus 11 or the vibrating transducer 14 of the apparatus 11. The driving unit 27 may be applied to any apparatus for driving an elongated vibrating body by exciting a vibrating transducer, which is coupled to one end of the vibrating body, with an oscillator.

Therefore, the present examples and embodiments are to be considered as illustrative and not restrictive and the invention is not to be limited to the details given herein, but may be modified within the scope and equivalence of the appended claims.

What is claimed is:

1. A driving unit for driving an apparatus having an elongated vibrating body, which has a first end and a second end, wherein the first end is associated with a first transducer, and the second end is associated with a detecting means for detecting vibration at the second end, the driving unit comprising:
   an oscillator connected to the first transducer, wherein the oscillator excites the first transducer, wherein, when excited, the first transducer vibrates the vibrating body; and
   a controller connected to the oscillator, wherein the controller controls the oscillator based on a detection signal from the detecting means to excite the first transducer.

2. The driving unit according to claim 1, wherein the driving unit drives the first transducer such that acoustic radiation pressure of sound waves generated by the vibration levitates an object carried on the elongated vibrating body.

3. The driving unit according to claim 2, wherein the controller controls the oscillator to excite the first transducer such that the sound waves become traveling waves.

4. The driving unit according to claim 1, wherein the controller varies the frequency of the oscillator within a predetermined range prior to operation, wherein the controller starts operation at a specific frequency in which the vibration of the second end is determined to be maximum based on a detection signal from the detecting means.

5. The driving unit according to claim 1, wherein the detecting means includes:
   a second transducer associated with the second end of the vibrating body; and
   a vibration sensing element connected to the second transducer.

6. The driving unit according to claim 5, wherein a detection signal from the detecting means include information representing a level and a phase of the vibration of the second end.

7. The driving unit according to claim 6, wherein the vibration sensing element incluses a voltage sensor for sensing output voltage and the phase of the second transducer.

8. The driving unit according to claim 5, wherein the first transducer and the second transducer have the same structure.

9. The driving unit according to claim 8, wherein the first transducer and the second transducer each has at least a pair of piezoelectric elements.

10. The driving unit according to claim 5, wherein the controller controls the oscillator such that the amplitude of vibration of the second transducer is at least equal to a predetermined value while the phase difference between the vibration of the first transducer and the second transducer is within a predetermined range.

11. The driving unit according to claim 5, wherein the oscillator is selectively connected to one of the first transducer and the second transducer so that the oscillator drives said one of the first transducer and the second transducer.

12. The driving unit according to claim 1, wherein the controller is further connected to a voltage sensor for detecting the voltage supplied to the first transducer, wherein the controller controls the oscillator in accordance with a detection signal from the voltage sensor and a detection signal from the detecting means.

13. The driving unit according to claim 1, wherein the detecting means includes a pick up that outputs signals representing the vibration generated at the second end.

14. A driving unit for driving an apparatus for levitating an object, the apparatus having an elongated vibrating body, which has a first end and a second end, wherein the first end is associated with a first transducer, and the second end is associated with a detecting means including a second transducer and a vibration sensing element which is connected to the second transducer, the driving unit comprising:
- an oscillator connected to the first transducer, wherein the oscillator excites the first transducer;
- a controller connected to the oscillator, wherein the controller controls the oscillator based on a detection signal from the detecting means to excite the first transducer; and
- the first transducer being driven to levitate the object by acoustic radiation pressure of sound waves generated by vibration on the vibrating body.

15. The driving unit according to claim 14, wherein the controller controls the oscillator to excite the first transducer such that the sound waves become traveling waves.

16. The driving unit according to claim 14, wherein the controller varies the frequency of the oscillator within a predetermined range prior to operation, wherein the controller starts operation at a frequency in which the vibration of the second end is determined to be maximum based on a detection signal from the detecting means.

17. The driving unit according to claim 16, wherein a detection signal from the detecting means includes information representing a level and a phase of the vibration of the second transducer.

18. The driving unit according to claim 16, wherein the vibration sensing element includes a voltage sensor for sensing output voltage and phase of the second transducer.

19. The driving unit according to claim 14, wherein the controller controls the oscillator such that the amplitude of vibration of the second transducer is at least equal to a predetermined value while the phase difference between the vibration of the first transducer and the second transducer is within a predetermined range.

* * * * *